June 23, 1942.  B. V. MITCHELL  2,287,320

VULCANIZING IMPLEMENT

Filed Aug. 21, 1940

Inventor
Byron V. Mitchell,
By Church & Church
His Attorneys

Patented June 23, 1942

2,287,320

UNITED STATES PATENT OFFICE 2,287,320

VULCANIZING IMPLEMENT

Byron V. Mitchell, Jamaica, N. Y.

Application August 21, 1940, Serial No. 353,585

2 Claims. (Cl. 219—46)

This invention relates to improvements in vulcanizing implements and, particularly, to a heating appliance or implement for use in vulcanizing articles in the repair thereof.

Oftentimes, an article that requires repair possesses a surface where the vulcanization has to be accomplished which is of irregular formation so that it is difficult to properly apply pressure and heat to the surface to be vulcanized. The primary object of the present invention, therefore, is to provide a vulcanizing implement in the form of a heating pad which will readily accommodate itself to the irregularities in the surface or contour of the article being repaired or vulcanized.

A further object of the invention is to provide a vulcanizing pad wherein the heating unit is provided on one surface with a body or mass of material of relatively high thermal conductivity and which is capable of readily conforming to irregularities in the surface or contour of the article being vulcanized.

More specifically, the invention contemplates a heating implement or pad consisting essentially of a heating unit, of more or less sheet-like formation to one side of which there is attached a container for a mass of granular or pulverized material of high thermal conductivity. For instance, aluminum flakes or powder may be used, but the mass of this material is only loosely confined in its container so that it may shift within the container whereby the exposed surface of the container will present a surface that is pliable or deformable to conform, when placed under slight pressure, to the surface of the article being repaired. Preferably, the opposite side of the sheet-like heating unit is provided with a second container filled with a material of low thermal conductivity, such as asbestos, whereby radiation of heat from that side of the heating unit is prevented, with the result that the heat is confined to the mass of aluminum powder and directed toward the point at which the vulcanized repair work is being done.

With these and other objects in view, the invention consists in certain details of construction and combinations and arrangements of parts, all as will hereinafter be more fully described, and the novel features thereof particularly pointed out in the appended claims.

In the accompanying drawing—

Figure 1:
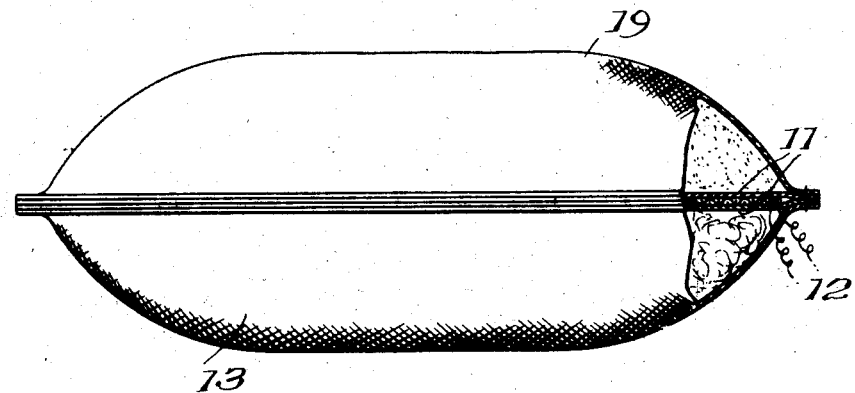
Figure 2:
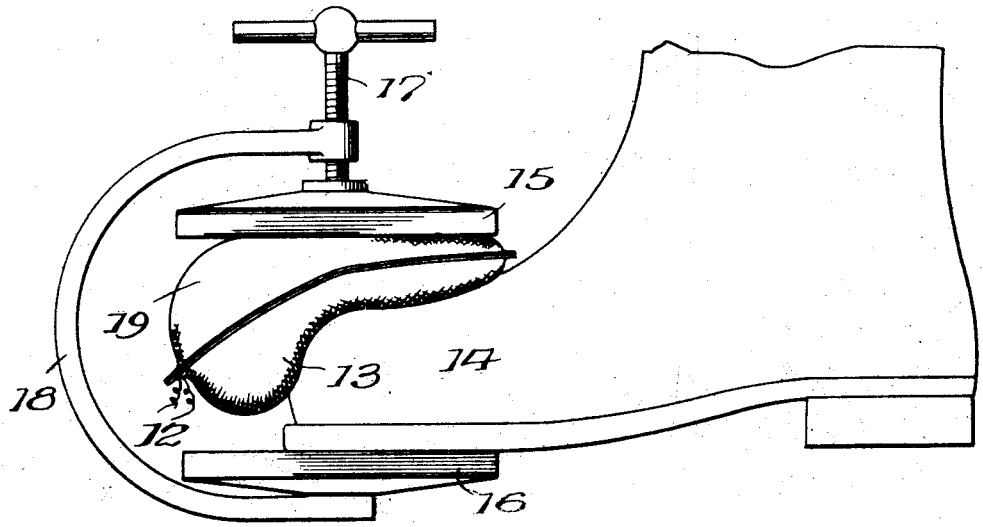
Figure 3:
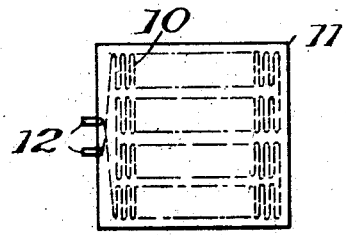

Figure 1 is an elevational view of the present heating pad with portions partially freed from one another to more clearly illustrate the construction, Fig. 2 is an elevational view illustrating more or less in outline the present heating pad applied to the surface of a boot or shoe in the operation of repairing the toe portion of the boot or shoe, and Fig. 3 is a diagrammatical plan view of the heating unit.

As will be readily appreciated, where a damaged surface to be repaired by vulcanizing a patch thereon has irregularities either in its surface or in its contour, it is quite difficult to properly apply the heating pad or implement to the surface over which the patch used in making the repair is applied. For instance, where the toe portion of a boot or shoe has been damaged and must be repaired by vulcanizing a patch thereon, it is quite difficult to subject the patch to the proper heat and pressure, particularly over the front rounded portion of the toe of the boot or shoe. With the present pad, these difficulties are totally eliminated by reason of the fact that that portion of the pad which contacts the surface being vulcanized or repaired is quite pliable or readily deformable so that it will accommodate itself to such irregularities.

In the preferred construction of the present heating implement, there is a mass of readily deformable material of relatively high thermal conductivity for conducting the heat from the heating unit of the implement to the surface being vulcanized. Preferably, a granulated or powdered material, such as aluminum flakes or powder, is used for this purpose. As best illustrated in Fig. 1, the heating unit is made of sheet-like formation, consisting of resistance wires 10 between layers of rubberized fabric 11. The heating unit proper, illustrated in the present instance, consists of a number of lengths of tape wherein the weft threads are formed by a fine wire and the warp threads are of asbestos, cotton or the like. Suitable leads 12 are provided for attachment to a suitable source of electric current whereby, when the current is passed through the wires 10, the proper degree of heat for vulcanizing purposes will be generated.

To one side of this pad, there is attached a container such as a section of rubberized fabric 13 sewed to the heating unit around the edge thereof. The container thus formed by this layer of fabric 13 is filled with the aluminum flakes or powder or other material of high thermal conductivity, but this material is not too tightly packed in the container so that, when the pad as a whole is placed under pressure in contact with an article to be repaired, such as a boot or shoe, the flakes or powder can shift around within the container 13 so that the exposed surface of the container will conform to the curvature or contour or the boot or shoe. By reason of the heating element being of a woven construction, it is highly flexible and can readily accommodate itself to shifting of the mass of material in container 13 and the consequent variations in the surface of that container.

This is best illustrated in Fig. 2, where the pad or implement is pressed against the toe portion of the boot or shoe 14 by means of clamping blocks 15, 16, urged toward one another by the screw 17 in the clamp bracket 18.

In order to minimize the loss of heat units developed by the heating unit, it is preferred that the opposite side of said unit be provided with a covering of low thermal conductivity. For this purpose, a second fabric container 19 may be stitched around the edge of the other side of the heating unit and filled with a non-conductive material, for instance, asbestos. Thus, practically all of the heat units developed in the implement will be directed through the filling of high conductive material in the container 13 to the area at which the vulcanizing is being accomplished in the repair of the article.

What I claim is:

1. A vulcanizing implement composed of a woven fabric container, a flexible partition dividing said container into two separate compartments, an electrical heating unit carried by said partition, a granular material of low thermal conductivity in one of said compartments, and a mass of granular material of high thermal conductivity loosely confined in the second compartment.

2. A vulcanizing implement composed of a woven fabric container, a flexible partition dividing said container into two separate compartments, a body of material of low thermal conductivity in one of said compartments, a mass of granular material of high thermal conductivity in the other compartment, and a flexible heating unit for heating said mass of granular material, said container being deformable to accommodate itself to deformations formed in said mass of material when pressed against the surface of an object to be operated on.

BYRON V. MITCHELL.